United States Patent

Wu et al.

[11] Patent Number: 5,705,036
[45] Date of Patent: Jan. 6, 1998

[54] WATER DISTILLING APPARATUS

[76] Inventors: Yueh-feng Wu; Mu-huo Chen, both of 2nd Fl., No. 14, Lane 81, Kwangchow St., Wanhua Dist., Taipei, Taiwan

[21] Appl. No.: 597,278

[22] Filed: Feb. 6, 1996

[51] Int. Cl.$^6$ ...................................... B01D 3/42
[52] U.S. Cl. .................. 202/176; 159/44; 159/46; 202/160; 202/167; 202/181; 202/185.2; 202/185.3; 202/185.5; 202/206; 203/1; 203/2; 203/10; 203/22; 203/27; 203/DIG. 8; 203/DIG. 18
[58] Field of Search ...................... 202/176, 180, 202/160, 181, 167, 185.3, 185.2, 190, 196, 202, 206, 185.5; 203/1, 10, 2, 100, DIG. 8, DIG. 17, 22, 27, DIG. 18; 392/402; 159/44, 46; 137/386, 391–395

[56] References Cited

U.S. PATENT DOCUMENTS

| | | | |
|---|---|---|---|
| 3,029,068 | 4/1962 | Skow | 202/177 |
| 3,687,817 | 8/1972 | Jimerson et al. | 202/185.3 |
| 4,110,170 | 8/1978 | Kirschman et al. | 202/160 |
| 4,247,369 | 1/1981 | Bean | 202/176 |
| 4,888,097 | 12/1989 | Palmer et al. | 203/10 |
| 4,906,337 | 3/1990 | Palmer | 203/10 |
| 5,021,128 | 6/1991 | Palmer | 203/4 |
| 5,266,170 | 11/1993 | Weber et al. | 202/185.3 |
| 5,281,309 | 1/1994 | Greene | 202/185.3 |
| 5,286,351 | 2/1994 | Salmon | 203/1 |
| 5,290,402 | 3/1994 | Tsai | 202/181 |
| 5,304,286 | 4/1994 | Palmer | 202/167 |
| 5,496,447 | 3/1996 | Wang | 202/185.3 |

*Primary Examiner*—Virginia Manoharan
*Attorney, Agent, or Firm*—Kirkpatrick & Lockhart LLP

[57] ABSTRACT

A water distilling apparatus includes a preheat tank having an inlet and an outlet for storing water from a water source via the inlet, a boiling tank formed of a conductive casing connected to a ground potential and having an inlet in connection with the outlet of the preheat tank, a heater located within the boiling tank to boil water thereby generating steam, and an outlet flue extending from the boiling tank through the preheat tank as to condense the steam and preheat the water within the preheat tank, a heat dissipation coil connected with the outlet flue out of the preheat tank, a fan blowing air against the heat dissipation coil, a cool water tank connected with the heat dissipation coil for storing condensed water therefrom, an electrode vertically extending into the boiling tank, electrically isolated from the case of the boiling tank and connected to a positive voltage source, a control circuit electrically connected to each of the electrode, the fan, and the heater for disconnecting the fan and the heater when a water level of the boiling tank is below the electrode, and a faucet for dispensing the water from the cool water tank.

10 Claims, 5 Drawing Sheets

WATER DISTILLING APPARATUS

BACKGROUND OF THE INVENTION

The present invention relates to a water distilling apparatus, and particularly to a water distilling apparatus which generates $OH^-$ ions in the distilled water.

There are many water processing apparatuses, such as purifying apparatuses, distilling apparatuses, etc., for purifying and boiling water, however, these apparatuses do not have a positive help to the health of humans. Thus, an advantage of the present invention is to provide distilled water with $OH^-$ which is beneficial to human health.

SUMMARY OF THE INVENTION

An object of the present invention is to provide a distilling water apparatus which provides $OH^-$ within the distilled water.

According to the present invention, a water distilling apparatus includes a preheat tank having an inlet and an outlet for storing water from a water source via the inlet, a boiling tank formed of a conductive casing connected to a ground potential and having an inlet in connection with the outlet of the preheat tank, a first heating means located within the bottom of the boiling tank to boil water and generate steam, and an outlet flue provided on the boiling tank for extending through the preheat tank as to condense the steam and preheat the water within the preheat tank, a heat dissipation coil connected with the outlet flue out of the preheat tank, a fan blowing air against the heat dissipation coil, a cool water tank connected with the heat dissipation coil for storing condensed water therefrom, a first electrode vertically extending into the boiling tank and electrically isolated from the case of the boiling tank and connected to a positive potential, control means electrically connected to the first electrode, the fan, and said heating means for disconnecting the fan and the heating means when a water level of the boiling tank is below the first electrode, and a faucet for dispensing the water from the cool water tank.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
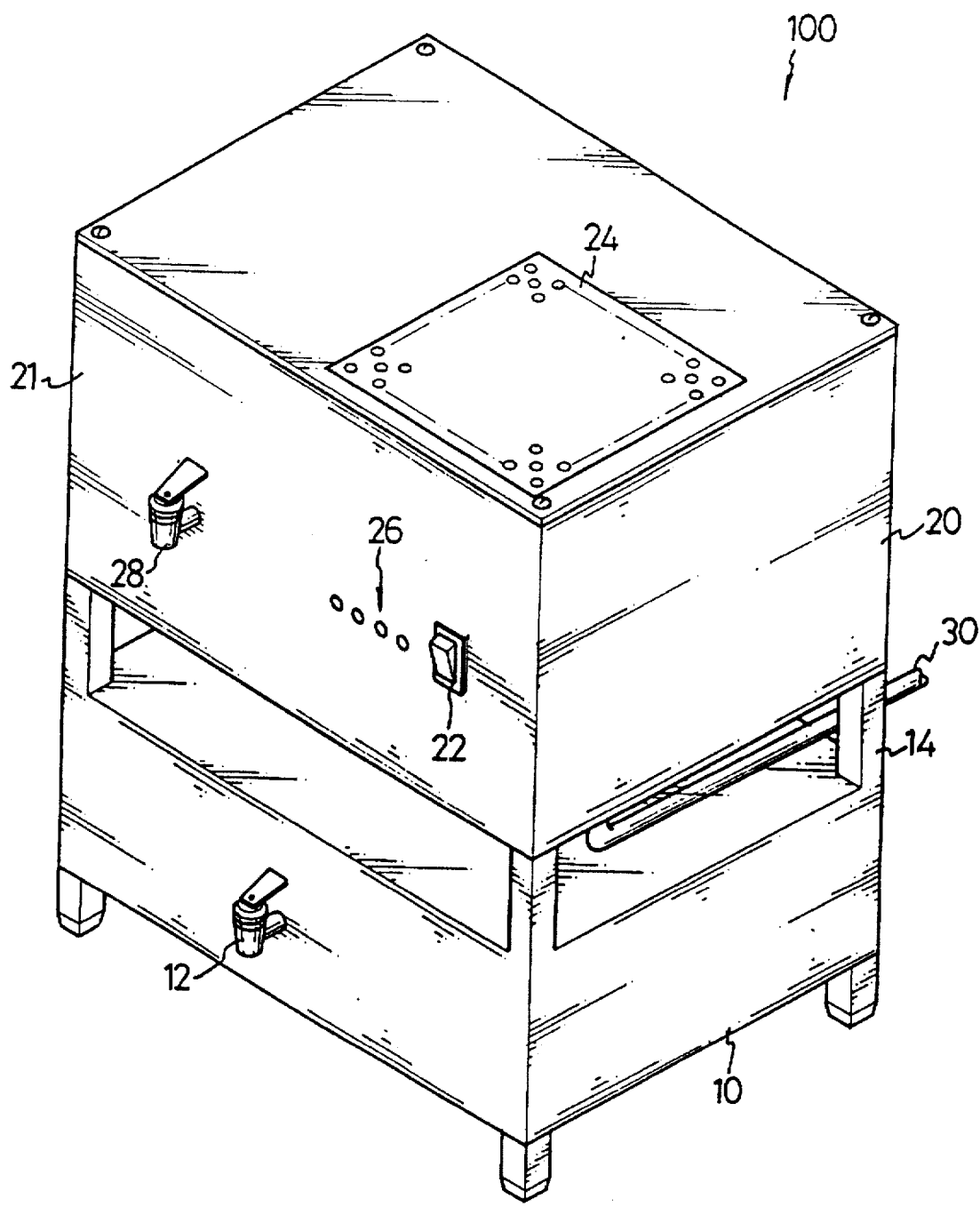
FIG. 1 is a perspective view of the distilling apparatus of the present invention.

Referring to FIG. 1, there is shown a perspective view of a water distilling apparatus 100 in accordance with the present invention. As shown in the drawing, the water distilling apparatus 100 includes a cool water tank 10 for storing cooled water, a cool water faucet 12 mounted on a front wall of the cool water tank 10, a water processing body 20, a plurality of columns 14 protruding from the cool water tank 10 for supporting the water processing body 20, a power switch 22 provided on a front wall 21 of the water processing body 20, a vent plate 24 provided on the water processing body 20 for exhausting the heat generated therefrom, a plurality of indicating lamps 26 provided on the front wall 21 thereof, a hot water faucet 28 mounted on the front wall 21 of the water processing body 20, and a water supply pipe 30 for supplying water into the water processing body 20.

Figure 2:
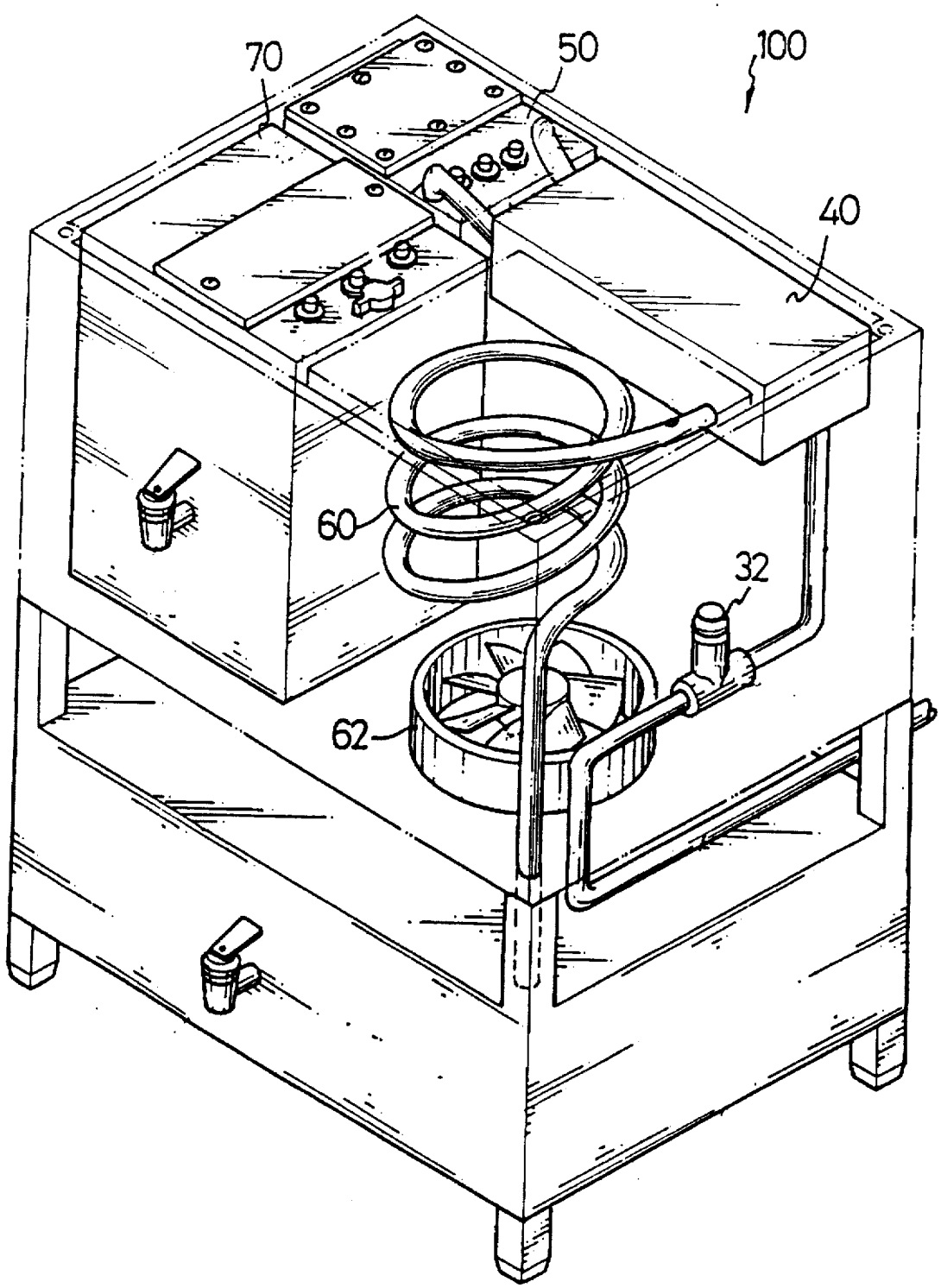
FIG. 2 is a perspective view of the distilling apparatus of FIG. 1 wherein walls thereof are removed.

As shown in FIG. 2, the water distilling apparatus 100 further includes a preheat tank 40, a boiling tank 50, an inlet valve 32, a helical heat dissipation coil 60, a cooling fan 62, and a hot water tank 70.

Figure 3:
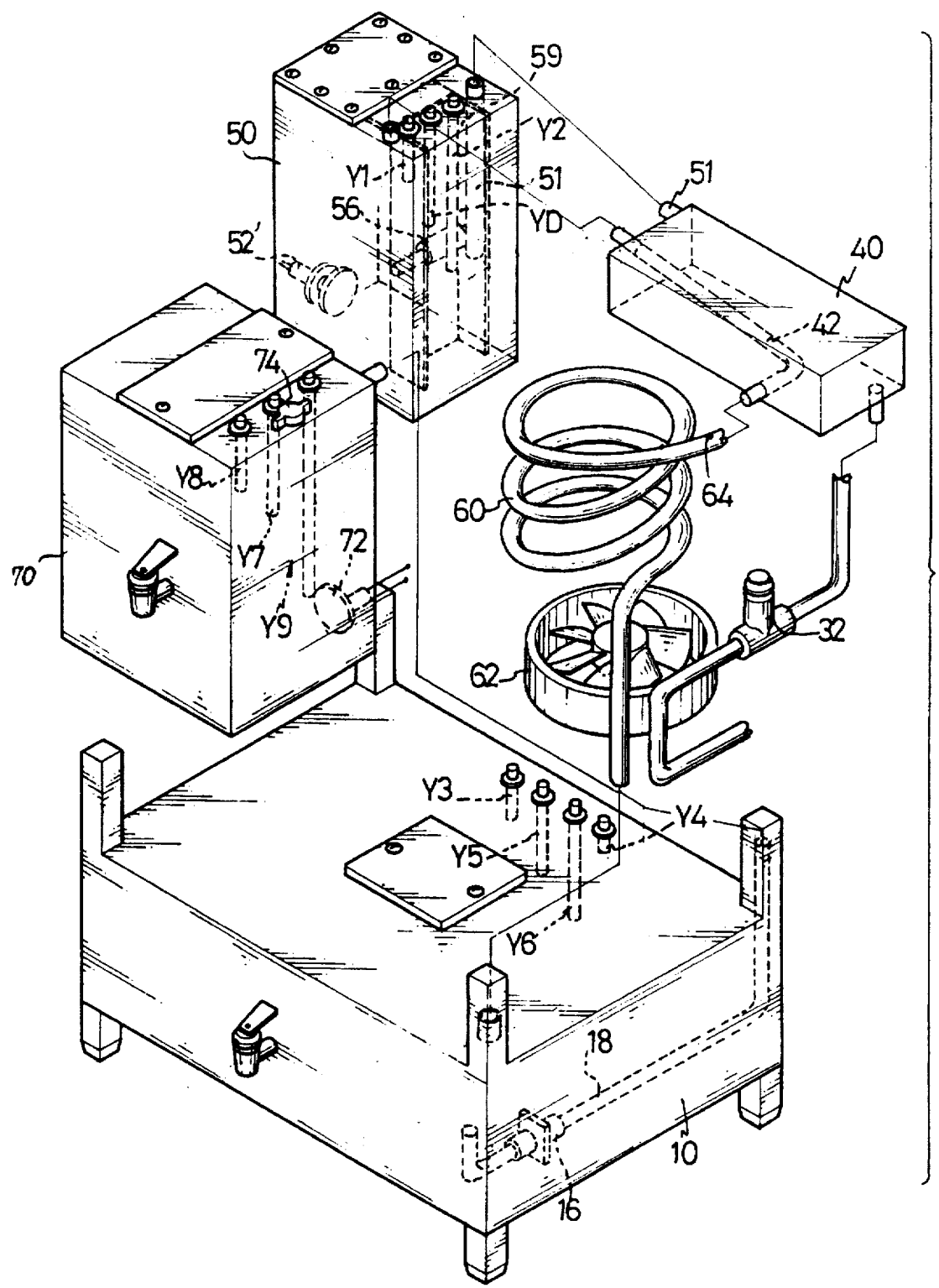
FIG. 3 is an exploded view of the distilling apparatus of the present invention.

Referring to FIG. 3, water is firstly supplied via the inlet valve 32 into the preheat tank 40 for preheating, the preheated water is then conveyed into the boiling tank 50 via a pipe 51 for boiling the preheated water by a plurality of heaters 52, 52' and generating steam, the steam generated in the boiling tank 50 is then conveyed into the preheat tank 40 via a cooling pipe 42 immersed within the preheat tank 40 for heating the water within the preheat tank 40 and condensing steam from the boiling tank 50 into water. The condensed water then flows into the cool water tank 10 via the heat dissipation coil 60, which are cooled by the cooling fan 62 controlled by a control circuit as mentioned later. An orifice 64 is defined in the uppermost portion of the heat dissipation coil 60 for dispensing chemical contaminants, such as chlorine etc.

A pump 16 is provided under a bottom of the cool water tank 10 for pumping water to the hot water tank 70 via a pipe 18. A heater 72 controlled by the control circuit later mentioned is provided within the hot water tank 70 for heating the distilled water to a desired temperature preset by a thermostat 74.

The boiling tank 50 has three titanium electrodes Y0, Y1, and Y2, the cool water tank 10 has four titanium electrodes Y3, Y4, Y5, and Y6, and the hot water tank 70 has three titanium electrodes Y7, Y8, and Y9 respectively in cooperation with the control circuit later-mentioned for detecting the water level of a corresponding tank and controlling the water supply valve 32 and the pump 16 via the control circuit in response to the detected water level. Further, each of the titanium electrodes serves as a positive electrode and a housing of corresponding tanks serves as a negative electrode so that when a suitable power is applied to the electrodes, an electrolysis is performed to the water within the corresponding tank as to acquire distilled water with $OH^-$. Further, as the tank is connected to a negative electric source, a cathodic protection is formed therein.

Figure 5:
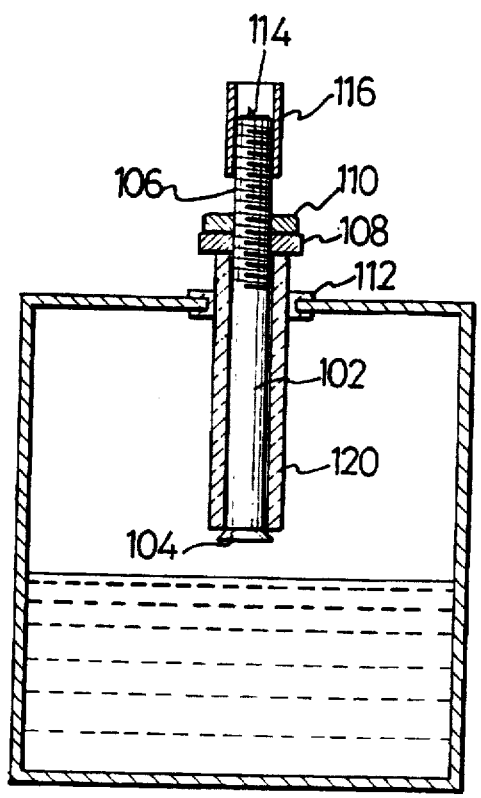
FIG. 5 is a cross-sectional view of an electrode and a tank of the present invention.

A detailed structure of a titanium electrode and a tank is shown in FIG. 5, the titanium electrode is formed in the shape of a screw 102 with a head 104 and a threaded end 106. The electrode is firstly inserted into a glass tube 120 and the threaded end 106 thereof is sequentially engaged with a silicone rubber seal 108 and a nut 110. Secondly, the head of the assembled electrode is inserted into a corresponding tank via a silicone rubber fastener 112. Finally, a tip 114 of the threaded end 106 of the titanium electrode is electrically connected to a conductive connector 116 coupled to a positive potential for performing the functions of water level measuring and electrolysis. In this arrangement, the electrode and the corresponding tank are electrically isolated by the glass tube 120 and the silicone rubber fastener 112.

Referring back to FIG. 3, the boiling tank 50 additionally has a drain 56 for expelling water out of the tank 50 when a user intends to clean inner walls of the tank 50. A longitudinal plate 58 of U-shaped cross-section is vertically secured on a wall of the boiling tank 50 and defines a longitudinal opening 59 enclosing the electrodes Y0, Y1, and Y2 and a length longer than that of any electrodes Y0, Y1, and Y2 for sheltering the titanium electrodes Y0, Y1, and Y2 within the boiling tank 50 from being exposed to a plurality of bubbles (not shown) generated as the water boils so that an incorrect water level detection is avoided.

Figure 4:
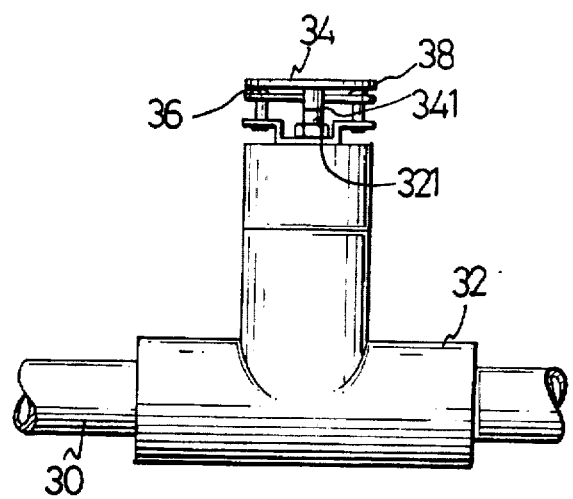
FIG. 4 is a plan view of an inlet valve of the present invention.

As shown in FIG. 4, the inlet valve 32 is further provided with a bimetallic thermostat 34 for protecting an electric coil (not shown) within the valve 32 from burning out when there is no water flowing from the water supply pipe 30 through the valve 32. The thermostat 34 is composed of a reed 341 in contact with a plunger 321 of the valve 32 and two normally-closed contacts 36, 38, when the reed 341 detects an abnormal temperature from the plunger 321 of the valve 32 resulting from water not passing through the valve 32, the 8 contacts 36, 38 will trip. This will cause a control circuit (shown in FIG. 6) to electrically disconnect the electric coil within the valve 32 to protect the electric coil from burning out.

Figure 6:
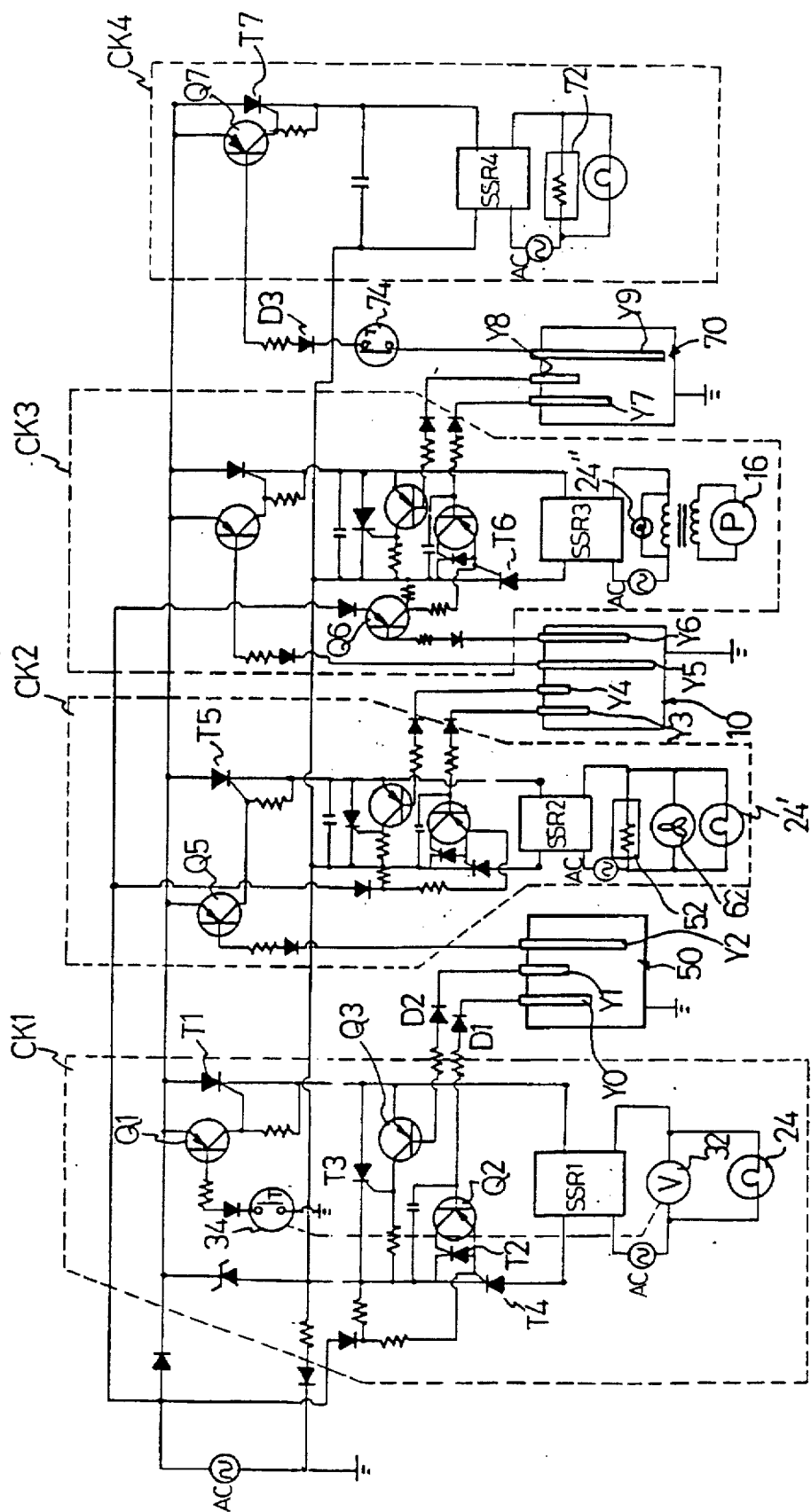
FIG. 6 is a circuit diagram of a control circuit of the water distilling apparatus of the present invention.

FIG. 6 illustrates a control circuit of the present invention. The control circuit is composed of a water supply circuit CK1, a boiling circuit CK2, a pump control circuit CK3, and a hot water control circuit CK4.

The water supply circuit CK1 is composed of a thermostat 34, a silicon controlled rectifier (SCR) T1, a transistor Q1 connected between an anode and a gate of the SCR T1, and a solid state relay (SSR1) as to control a valve 32 and a lamp 24 connected at an output end of the SSR1. The water supply circuit CK1 also has two SCRs T2, T3, two transistors Q2, Q3 respectively connected between an anode and a gate of a corresponding SCR T2, T3, a diode D1 connected between a low level electrode Y0 and the transistor Q2, a diode D2 connected between a high level electrode Y1 and the transistor Q3, and an SCR T4 having a gate connected to the anode of the SCR T2. The electrodes Y0 and Y1 are immersed within a boiling tank 50 connected to a ground as mentioned. When a water level of the boiling tank 50 is below the low level electrode Y0, i.e., the low level electrode Y0 is in a high potential, the transistor Q2 and the SCR T2 are in an "off" status so that the SCR T4 is in an "on" status, then SSR1 will be activated, the valve 32 will be opened. When the water level of the boiling tank 50 reaches the high water level electrode Y1, the transistor Q3 and the SCR T3 will be in an "on" status, the SSR1 will be in an "off" status so that the valve 32 will be closed. Additionally, if the normally-closed contacts 36, 38 of the thermostat 34 are activated, the transistor Q1 and SCR T1 will also be turned off so that the valve 32 will also be closed.

The boiling circuit CK2 has a similar arrangement to that of the water supply circuit CK1 Except that the boiling circuit CK2 has an SSR2 which is used for controlling a heater 52, a cooling fan 62, and a lamp 24' and comprises a long electrode Y2 immersed within the boiling tank 50, a transistor Q5 and an SCR TS for disabling the SSR2 when the water level of the boiling tank 50 is below the long electrode Y2 thereby turning off the heater 52 and the fan 62. Similarly, a low level electrode Y3 and a high level electrode Y4 are immersed within the cool water tank 10 and operate in a similar function to that of the high level and low level electrodes Y0, Y1 of the water supply circuit CK1.

The pump control circuit CK3 has a similar arrangement to the boiling circuit CK2 except that an SSR3 is used to control a pump 16 and a lamp 24" and comprising an SCR T6, a transistor Q6, and a pumping indicating electrode Y6. The pump control circuit CK3 also has a low water level electrode Y7 and a high water level electrode Y8 immersed within the hot water tank 70. When a water level of the hot water tank 70 is below the low water level electrode Y7 and a water level of the cool water tank 10 rises to the pumping indicating electrode Y6, the pump 16 will be activated. If the water level of the cool water tank 10 is below a long electrode Y5 immersed therewithin, the pump 16 will be turned off.

The hot water control circuit CK4 only uses a set of SCR T7, a transistor Q7, a diode D3, a thermostat 74, a long electrode Y9, and an SSR4 in a similar circuit arrangement to the water supply circuit CK1. When a water level of the hot water tank 70 is below the long electrode Y9, a heater 72 within the hot water tank 70 will be turned off. When a water temperature of the water within the hot water tank is below a preset temperature, the heater 72 will be activated to heat the water to a desired temperature. Note that this heating procedure is only activated when the water level of the hot water tank 70 reaches the long electrode Y9.

Although the invention has been explained in relation to its preferred embodiment, it is to be understood that many other possible modifications and variations can be made without departing from the spirit and scope of the invention as hereinafter claimed.

I claim:

1. A water distilling apparatus comprising:

a preheat tank having an inlet and an outlet for storing water from a water source via the inlet;

a boiling tank formed of a conductive casing connected to a ground potential and having an inlet in connection with the outlet of the preheat tank, a first heating means located within the bottom of the boiling tank to boil water and generate steam, an outlet flue provided on the boiling tank for extending through the preheat tank to condense the steam into water and preheat water within the preheat tank and a first water level detection means with a first end vertically extending into the boiling tank, and electrically isolated from the casing of the boiling tank and a second end electrically connected to a positive potential;

a heat dissipation coil connected with the outlet flue out of the preheat tank;

a fan blowing air against the heat dissipation coil;

a cool water tank electrically connected to the ground potential and coupled with the heat dissipation coil for storing the condensed water therefrom;

control means electrically connected to the first water level detection means, the fan, and said first heating means for disconnecting the fan and the heating means when a water level of the boiling tank is below the first water level detection means; and a first faucet mounted on the cool water tank for dispensing the water from the cool water tank;

an inlet valve secured on the inlet of the preheat tank for controlling water from the water source;

a second water level detection means vertically extending into the boiling tank, having a length shorter than the first water level detection means, and electrically connected with said control means for generating a signal to the control means to activate the valve when the water level of the boiling tank is below the second water level detection means; and a third water level detection means vertically extending into the boiling tank and having a length shorter than the second water level detection means and electrically connected with said control means for generating a signal to the control means to deactivate the valve when the water level of the boiling tank reaches the third water level detection means.

2. The water distilling apparatus according to claim 1 further comprising:

a thermostat mounted on the inlet valve and electrically connected to said control means for deactivating the valve when a temperature of the inlet valve exceeds a predetermined temperature set on the thermostat.

3. The water distilling apparatus according to claim 1 further comprising:

a fourth water level detection means immersed within the cool water tank and electrically connected with said control means for generating a signal to said control means to activate the first heating means when a water level of the cool water tank is below the fourth water level detection means;

a fifth water level detection means vertically extending into the cool water tank, having a length shorter than the fourth water level detection means, and electrically connected with said control means for generating a signal to the control means to deactivate the first heating means when the water level of the cool water tank reaches the fifth water level detection means.

4. The water distilling apparatus according to claim 1 further comprising:

a hot water tank electrically connected to the ground potential;

a pipe connected between the hot water tank and the cool water tank;

a pump mounted on the pipe for pumping the water within the cool water tank into the hot water tank;

a second heating means electrically connected to said control means and immersed within the hot water tank for boiling the water therewithin;

a sixth water level detection means vertically extending into the cool water tank and electrically connected with said control means for generating a signal to the control means to deactivate the pump when a water level of cool water tank is below the sixth water level detection means;

a seventh water level detection means vertically extending into the cool water tank with a length shorter than the sixth water level detection means and electrically connected with said control means for generating a signal to the control means to activate the pump when the water level of the cool water tank reaches the seventh water level detection means;

an eighth water level detection means vertically extending into the hot water tank and electrically connected to said control means for generating a signal to said control means to activate the pump when a water level of the hot water tank is below the eighth water level detection means;

a ninth water level detection means vertically extending into the hot water tank with a length shorter than the eighth water level detection means and electrically connected with said control means for generating a signal to said control means to deactivate the pump when the water level of the hot water tank reaches the ninth water level detection means; and a second faucet mounted on the hot water tank for dispensing the water from the hot water tank.

5. The water distilling apparatus according to claim 4 further comprising:

a tenth water level detection means having a length greater than the eighth water level detection means and electrically connected to said control means for generating a signal to the control means to deactivate the second heating means when the water level of the hot water tank is below the tenth water level detection means.

6. The water distilling apparatus according to claim 5 further comprising:

a thermostat connected between the tenth water level detection means and the control means for controlling a water temperature within the hot water tank.

7. The water distilling apparatus according to claim 1 wherein each of said water level detection means is formed of a titanium electrode and a glass tube for receiving the electrode.

8. The water distilling apparatus according to claim 7 wherein each of said electrodes is screw-shaped and has a head portion and a threaded end.

9. The water distilling apparatus according to claim 8 further comprising:

a fastener secured on each glass tube for mounting the water level detection means onto a corresponding tank;

a seal provided on each of said water level detection means for sealing the glass tube and the electrode; and a nut threadably engaged with a corresponding threaded end of each electrode for biasing the seal onto the glass tube and adjusting a length thereof within the corresponding tank.

10. The water distilling apparatus according to claim 1 further comprising a longitudinal plate of U-shaped cross-section vertically secured within the boiling tank and defining a longitudinal opening enclosing the first, the second, and the third water level detection means and a length longer than the first water level detection means for sheltering the first, the second, and the third water level detection means.

* * * * *